United States Patent [19]

Latsko

[11] Patent Number: 5,086,899
[45] Date of Patent: Feb. 11, 1992

[54] COUPLING ASSEMBLY COMPONENT

[75] Inventor: James M. Latsko, North Royalton, Ohio

[73] Assignee: Eaton Corporation, North Royalton, Ohio

[21] Appl. No.: 731,493

[22] Filed: Jul. 17, 1991

[51] Int. Cl.⁵ .............................................. F16D 25/04
[52] U.S. Cl. .................................. 192/88 B; 192/30 V
[58] Field of Search ................. 192/88 B, 88 R, 88 A, 192/30 V, 106.1, 109 F, 85 AT; 188/367, 366, 264 G

[56] References Cited

U.S. PATENT DOCUMENTS

| | | | |
|---|---|---|---|
| 2,203,862 | 6/1940 | Eason | 192/88 B |
| 2,251,444 | 8/1941 | Fawick | 192/88 B |
| 2,354,174 | 7/1944 | Schmitter | 192/88 B |
| 2,418,099 | 3/1947 | Schmitter et al. | 192/107 T |
| 2,630,198 | 3/1953 | Kraft | 192/88 B |
| 2,708,994 | 5/1955 | Kraft | 192/88 B |
| 3,173,526 | 3/1965 | Eakin | 192/88 B X |
| 4,552,257 | 11/1985 | Witt | 192/56 F |
| 4,958,713 | 12/1990 | Latsko | 192/88 B |

OTHER PUBLICATIONS

Space Saving-Doughnt-Type Rubber Coupling, Daihatsu.

Primary Examiner—Rodney H. Bonck
Attorney, Agent, or Firm—Tarolli, Sundheim & Covell

[57] ABSTRACT

A coupling assembly component transmits force between a pair of elements and dampens the transmission of vibration between the elements. The coupling assembly component includes an annular base which is adapted to be connected with one of the elements. An annular fluid extensible tube is coaxial with the base and is extensible under the influence of fluid pressure in the tube to move friction surfaces into engagement. The tube includes a reinforcing layer which is enclosed by a cover layer formed of an elastomeric material. An annular layer of vibration damping material is molded between and is bonded to the cover layer of the tube and the base. The layer of vibration damping material and cover layer have different vibration damping characteristics. The layer of vibration damping material has a radial extent which is at least twice as great as the radial extent of a portion of the cover layer disposed between the reinforcing layer of the tube and the annular layer of vibration damping material.

17 Claims, 2 Drawing Sheets

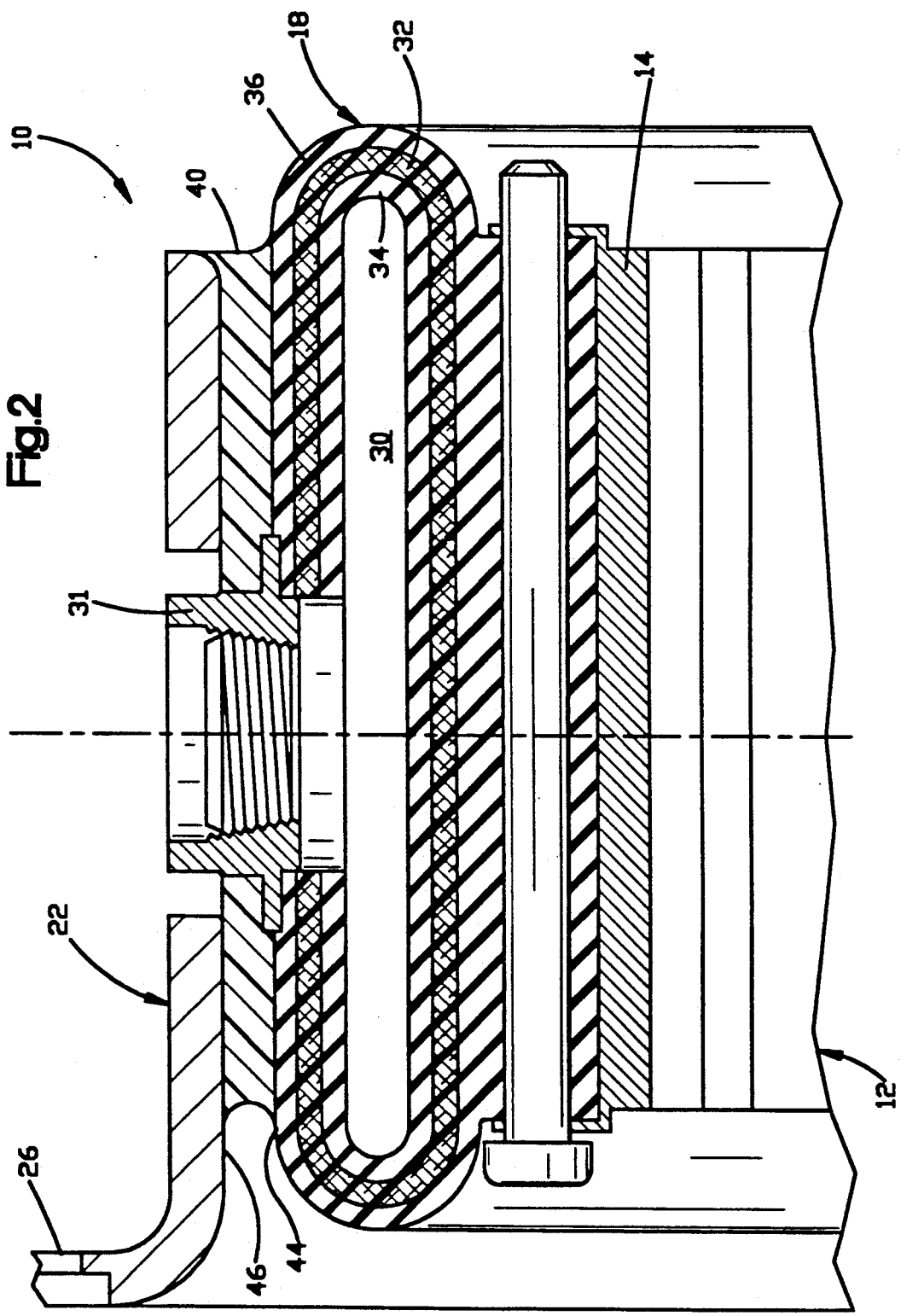

COUPLING ASSEMBLY COMPONENT

BACKGROUND OF THE INVENTION

The present invention relates to a new and improved component of a coupling assembly which may function as either a clutch or a brake between a pair of elements and which dampens the transmission of vibration between the elements while transmitting force between the elements.

Known coupling assemblies which are used as either a clutch or a brake are disclosed in U.S. Pat. Nos. 2,203,862; 2,354,174; 2,418,099; 2,708,994; 4,552,257; and 4,958,713. Each of these known coupling assemblies has an annular base which is fixedly connected to one of two elements between which force is to be transmitted. An annular array of friction shoes is engageable with a friction surface connected with the other element. An annular fluid extensible tube is disposed between the base and the annular array of friction shoes.

When any one of these known coupling assemblies is used to transmit force between a pair of elements, vibration is also transmitted between the elements. To retard the transmission of vibration, a torsional coupling assembly has been connected in series with the coupling which functions as a brake or clutch. A typical torsional coupling assembly included an annular body of rubber disposed between and bonded to inner and outer metal housing sections. However, the provision of two coupling assemblies in a drive line increases the length of the drive line.

To reduce the length of the drive line, it has previously been suggested that the coupling assembly which functions as a clutch or brake and the torsional coupling assembly be combined. This was done by mounting a fluid extensible tube radially outwardly of a cylindrical metal band which extends around the outside of an annular body of rubber. A friction surface connected with the fluid extensible tube moves into engagement with the cylindrical metal band around the outside of the annular body of rubber when the tube is inflated. Heat generated by engagement of the friction shoe assemblies with the metal band can be readily transferred through the metal band to the annular body of rubber.

SUMMARY OF THE INVENTION

The present invention provides a new and improved coupling assembly component for damping the transmission of vibration between a pair of elements while transmitting force between the pair of elements. The coupling assembly component includes an annular base which is connected with one of the elements. A first annular friction surface is coaxial with the base and is movable into engagement with a second annular friction surface connected with the other element. An annular fluid extensible tube is coaxial with the base and is radially extensible under the influence of fluid pressure in the tube to move the first friction surface into engagement with the second friction surface. The fluid extensible tube includes a reinforcing layer and a cover layer which extends around the reinforcing layer.

In accordance with a feature of the invention, an annular layer of vibration damping material is disposed between the fluid extensible tube and the base. The annular layer of vibration damping material and the material forming the cover layer of the fluid extensible tube may have different compositions and/or vibration damping characteristics. The annular layer of vibration damping material may advantageously be molded between the fluid extensible tube and the base. The tube separates the friction surfaces from the annular layer of vibration damping material to retard the transfer of heat to the layer of vibration damping material.

The annular layer of vibration damping material may have a radial extent which is at least twice as great as the radial extent of a portion of the cover layer disposed between the reinforcing layer and the annular layer of vibration damping material. It is presently believed to be advantageous to have the annular layer of vibration damping material formed of a material which is softer than the cover layer of the fluid extensible tube. In one specific embodiment of the invention, the cover layer was formed of neoprene and the annular layer of vibration damping material was formed of natural rubber. However, it is contemplated that they could be formed of different materials and/or the same material if desired.

Accordingly, it is an object of this invention to provide a new and improved coupling assembly component for damping the transmission of vibration between a pair of elements while transmitting force between the elements and wherein the coupling assembly component includes a fluid extensible tube having a cover layer and an annular layer of vibration damping material.

Another object of this invention is to provide a new and improved coupling assembly as set forth in the preceding object and wherein the annular layer of vibration damping material has vibration damping characteristics which are different than the vibration damping characteristics of the material forming the cover layer of the tube.

Another object of this invention is to provide a new and improved coupling assembly as set forth in either of the preceding objects and wherein the layer of vibration damping material has a radial extent which is at least twice as great as the radial extent of a portion of the cover layer disposed between a reinforcing layer of the tube and the annular layer of vibration damping material.

BRIEF DESCRIPTION OF THE DRAWINGS

The foregoing and other objects and features of the present invention will become more apparent upon a consideration of the following description taken in connection with the accompanying drawings, wherein:

FIG. 2 is a sectional view, taken generally along the line 2—2 of FIG. 1 and illustrating the relationship between a rigid annular base or rim, a layer of vibration damping material, a fluid extensible tube, and a friction shoe.

DESCRIPTION OF ONE SPECIFIC PREFERRED EMBODIMENT OF THE INVENTION

Figure 1:
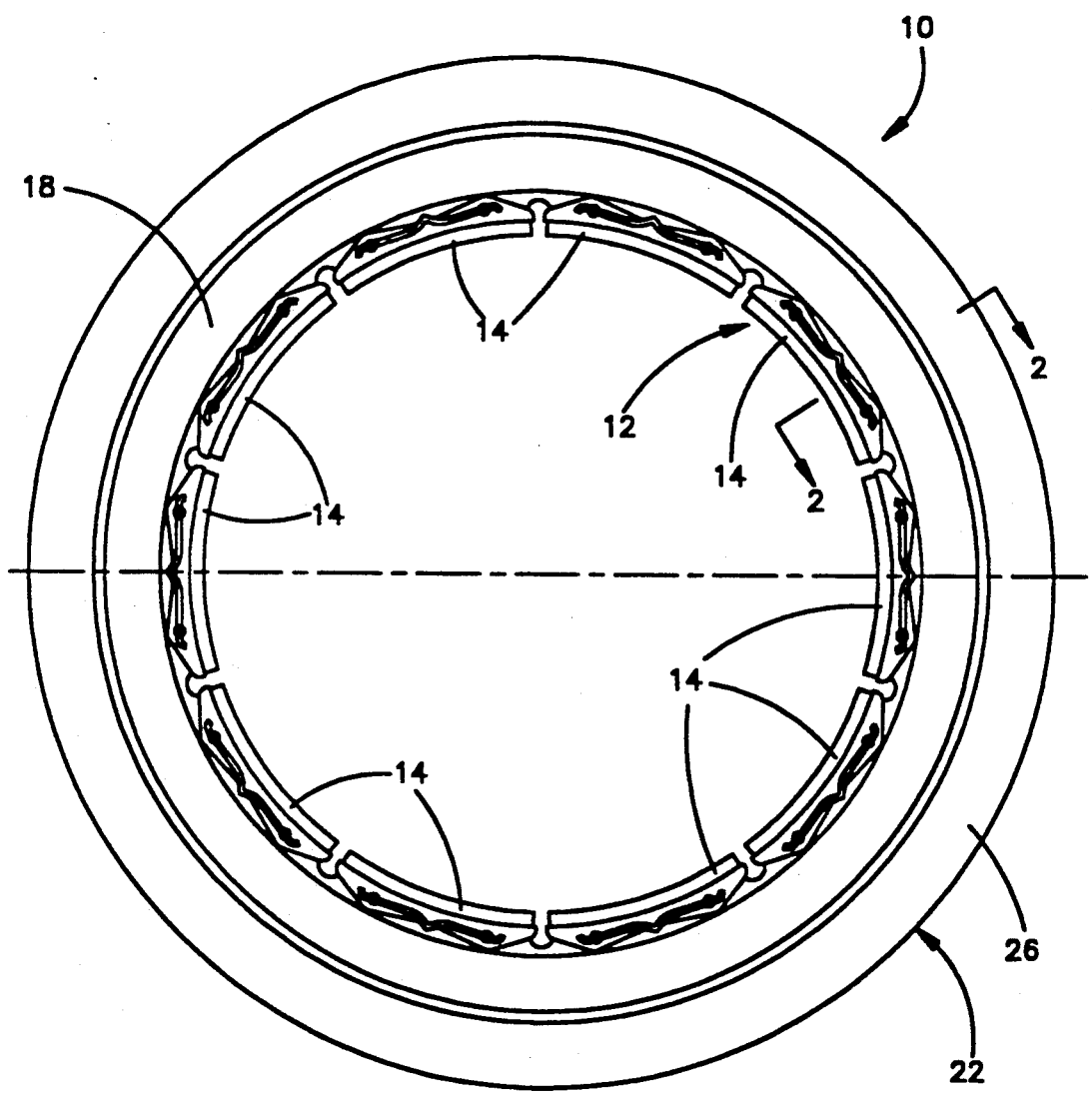
FIG. 1 is a plan view of a coupling assembly component which is constructed in accordance with the present invention to dampen vibration between a pair of elements while transmitting force between the elements.

A coupling component 10 (FIG. 1), constructed in accordance with the present invention, includes an annular array 12 of friction shoe assemblies 14. The friction shoe assemblies 14 are engageable with the outside of a drum or second coupling component (not shown)

to interconnect the two coupling components. The coupling component 10 could function as part of either a brake or a clutch.

The friction shoe assemblies 14 are moved into engagement with the drum by radial expansion of an annular inflatable tube 18. Thus, when fluid pressure, such as air pressure, is conducted through a conduit to the annular tube 18, the tube expands radially inwardly. This causes the tube 18 to press the friction shoe assemblies 14 against the drum. The friction between the shoe assemblies 14 and the drum interconnect the drum and the coupling component 10. During initial engagement of the friction shoe assemblies 14 with the outer side surface of the drum, slippage occurs between the friction shoe assemblies and the drum with a resulting generation of heat.

A rigid annular metal rim or base 22 is connected with the inflatable tube 18. The rim or base 22 has an annular mounting flange 26 which is used to connect the coupling component 10 with an associated apparatus. Upon inflation of the tube 18, the friction shoe assemblies 14 are moved away from the rim 22 and pressed against the drum. At this time, the tube 18 transmits force between the friction shoe assemblies 14 and the rim 22. Although the coupling component 10 has been illustrated as moving the friction shoe assemblies 14 inwardly to engage the outside of a second coupling component, the friction shoe assemblies could be moved radially outwardly to engage the inside of a second coupling component if desired.

To enable the tube 18 to be inflated, the tube has an annular inner chamber or cavity 30 (FIG. 2) which is connected in fluid communication with a source of fluid pressure (air) through a fitting 31 connected with the rim 22 by a suitable conduit (not shown). To enable the tube 18 to transmit relatively large forces, an annular reinforcing layer 32 is provided. A liner layer 34 of elastomeric material covers the inside of the reinforcing layer 32 to block the passage of fluid from the chamber 30 through the reinforcing layer. A cover layer 36 of elastomeric material is provided outside of the reinforcing layer 32 to protect the reinforcing layer and enhance the ability of the tube 18 to retain air under relatively high pressure in the chamber 30.

Although the reinforcing layer 32 could be formed in many different ways, in the illustrated embodiment of the invention, reinforcing layer is formed by biased plies or belts of cord with natural rubber (natural polyisoprene) in and between the plies. In the illustrated embodiment of the invention, the liner layer 34 and cover layer 36 are formed of neoprene. However, they could be formed of other materials if desired. The tube 18 ma be connected with the friction shoe assemblies 14 in many different ways, including the manner disclosed in U.S. Pat. No. 4,958,713 and in co-pending U.S. patent application Ser. No. 520,223 filed May 9, 1990 and entitled "Coupling Component and Method of Making the Same".

In accordance with a feature of the present invention, an annular layer 40 of vibration damping material is provided between the cover layer 36 and the rim or base 22. The annular layer 40 of vibration damping material retards the transmission of vibration between the rim 22 and a drum (not shown) which is engaged by friction shoe assemblies 14 during the transmission of force by the coupling component 10. Since the layer 40 of vibration damping material is disposed on a side of the tube 18 opposite from the friction shoe assemblies 14, the tube insulates the layer of vibration damping material from heat generated by engagement of the friction shoe assemblies 14 with the drum.

In order to promote the absorption of vibration by the vibration damping layer 40, the vibration damping layer is advantageously formed of an elastomeric material which is softer than the elastomeric material forming the cover layer 36 of the tube 18. Thus, in the illustrated embodiment of the invention, the cover layer 36 of the tube 18 had a Shore A hardness of approximately 60 and the vibration damping layer 40 had a Shore A hardness of approximately 35. It is contemplated that the cover layer 36 and vibration damping layer will have hardnesses which differ from these specific hardnesses. However, it is presently preferred to have the hardness of both the cover layer 36 and the vibration damping layer 40 within a range from a Shore A hardness of 20 to a Shore A hardness of 90.

It is contemplated that the vibration damping layer 40 and the cover layer 36 of the tube 18 could be formed of the same material. However, in the illustrated embodiment of the invention, the cover layer 36 of the tube 18 is formed of neoprene and the vibration damping layer 40 is formed of natural rubber (natural polyisoprene). Of course, the cover layer 36 of the tube 18 and/or the vibration damping layer 40 could be formed of other materials if desired. For example, either the cover layer 36 or the vibration damping layer 40 could be formed of ethylene propylene or of synthetic polyisoprene if desired.

The annular vibration damping layer 40 has a radial thickness which is at least twice as great as the radial thickness of the portion of the outer layer 36 disposed between the reinforcing layer 32 and the vibration damping layer. Thus, where it is preferred to mold the vibration damping layer 40 with a radial thickness of approximately one inch, it is preferred to form the portion of the cover layer 36 disposed between the reinforcing layer 32 and the vibration damping layer 40 with a radial thickness of 0.500 inches or less. Thus, in the illustrated embodiment of the invention, the vibration damping layer 40 had a radial thickness of 1.00 inch while the portion of the cover layer 36 disposed between the reinforcing layer 32 and the vibration damping layer 40 had a radial thickness of approximately 0.25 of an inch.

During formation of the coupling component 10, the rim 26 and tube 18 are placed in a mold with the elastomeric material of the tube 18 in an uncured condition. An uncured body of elastomeric material, which is to form the vibration damping layer 40 is placed in the mold between an annular outer side surface 44 of the cover layer 36 of the tube 18 and a cylindrical inner side surface 46 of the rim 22. The tube 18 is then inflated to press the cover layer 36 against material which is to form the vibration damping layer 40 and to press the vibration damping material against the rim 22. The mold is then heated to vulcanize the material of the tube 18 and the vibration damping layer 40. During vulcanization, the elastomeric material forming the vibration damping layer 40 is bonded to the rim surface 46 and the cover layer surface 44.

Although it is presently preferred to form the vibration damping layer 40 and cover layer 36 of different materials, they could be formed of the same material if desired. Even if the cover layer 36 and vibration damping layer 40 are formed of the same material, the material forming the damping layer 40 could have physical characteristics which are different than the physical characteristics of the material forming the cover layer 36 to enhance the vibration damping characteristics of the vibration damping layer. Thus, the material forming the vibration damping layer 40 could be softer than the material forming the cover layer 36 even though they are both formed of the same material, for example, neoprene.

In the illustrated embodiment of the invention, the rim 22 extends around the outside of the tube 18 and the friction shoe assemblies 14 are pressed against the outside of a cylindrical drum. However, it is contemplated that the tube 18 could be disposed around the outside of the rim 22 and the friction shoes 14 disposed adjacent to a radially outer side of the tube 18. If this was done, the friction shoe assemblies 14 would engage a cylindrical inner side surface of a hollow drum.

In view of the foregoing description, it is apparent that the present invention provides a new and improved coupling assembly component 10 which can be used in either a clutch or a brake to dampen the transmission of vibration between a pair of elements while transmitting force between the pair of elements. The coupling assembly component 10 includes an annular base 22 which is connected with one of the elements. A first annular friction surface formed by the friction shoe assemblies 14 is coaxial with the base 22 and is movable into engagement with a second annular friction surface (not shown) connected with the other element. An annular fluid extensible tube 18 is coaxial with the base 22 and is radially extensible under the influence of fluid pressure in the tube to move the first friction surface on the friction shoe assemblies 14 into engagement with the second friction surface. The fluid extensible tube 18 includes a reinforcing layer 32 and a cover layer 36 which extends around the reinforcing layer.

In accordance with a feature of the invention, an annular layer 40 of vibration damping material is disposed between the fluid extensible tube 18 and the base 22. The annular layer 40 of vibration damping material and the material forming the cover layer 36 of the fluid extensible tube 18 may have different compositions and/or vibration damping characteristics. The annular layer 40 of vibration damping material may advantageously be molded between the fluid extensible tube 18 and the base 22. The tube 18 separates the friction shoe assemblies 14 from the annular layer 40 of vibration damping material to retard the transfer of heat to the layer of vibration damping material.

The annular layer 40 of vibration damping material may have a radial extent which is at least twice as great as the radial extent of a portion of the cover layer 36 disposed between the reinforcing layer 32 and the annular layer 40 of vibration damping material. It is presently believed to be advantageous to have the annular layer 40 of vibration damping material formed of a material which is softer than the cover layer 36 of the fluid extensible tube 18. In the illustrated embodiment of the invention, the cover layer 36 was formed of neoprene and the annular layer of vibration damping layer 40 was formed of natural rubber (natural polyisoprene). However, it is contemplated that they could be formed of different materials and/or the same material if desired.

Having described the invention, the following is claimed:

1. A coupling assembly component for damping the transmission of vibration between first and second elements while transmitting force between the first and second elements, said coupling assembly component comprising an annular base adapted to be connected with the first element, a first annular friction surface which is coaxial with said base and is movable into engagement with a second annular friction surface connected with the second element, annular fluid extensible tube means which is coaxial with said base and is radially extensible under the influence of fluid pressure in said tube means to move said first friction surface into engagement with the second friction surface, said annular fluid extensible tube means including a reinforcing layer and a cover layer, said cover layer being formed of an elastomeric material and extending around said reinforcing layer, and an annular layer of vibration damping material disposed between and connected with said tube means and said base, said annular layer of vibration damping material being formed of an elastomeric material having vibration damping characteristics which are different than the vibration damping characteristics of the elastomeric material forming said cover layer.

2. A coupling assembly component as set forth in claim 1 wherein said cover layer of said tube means is formed of neoprene and said annular layer of vibration damping material is formed of natural rubber.

3. A coupling assembly component as set forth in claim 1 wherein said annular layer of vibration damping material is molded against an annular side surface of said cover layer of said tube means and an annular side surface of said base.

4. A coupling assembly component as set forth in claim 1 wherein said cover layer has a first hardness and said annular layer of vibration damping material has a second hardness which is less than said first hardness.

5. A coupling assembly component as set forth in claim 4 wherein said first hardness is a Shore A hardness of approximately 60 and said second hardness is a Shore A hardness of approximately 35.

6. A coupling assembly component as set forth in claim 1 wherein the radial extent of said annular layer of vibration damping material is at least twice as great as the radial extent of a portion of said cover layer disposed between said reinforcing layer and said annular layer of vibration damping material.

7. A coupling assembly component as set forth in claim 1 wherein said annular base circumscribes said annular fluid extensible tube means and said annular layer of vibration damping material is disposed between said tube means and a radially inner side surface of said annular base, said annular fluid extensible tube means being extendable radially inwardly to move said first friction surface into engagement with the second friction surface.

8. A coupling assembly component as set forth in claim 1 wherein the elastomeric material forming said cover layer has a different composition than the elastomeric material forming said layer of vibration damping material.

9. A coupling assembly component as set forth in claim 1 wherein said cover layer of said tube means and said annular layer of vibration damping material have Shore A hardnesses in the range of 20 to 90.

10. A coupling assembly component as set forth in claim 1 wherein said annular fluid extensible tube means has radially inner and outer side portions, said first annular friction surface being connected with a first one of said side portions of said tube means, said annular layer of vibration damping material being connected with a second one of said side portions to enable said tube means to retard heat transfer from said first annular friction surface to said annular layer of vibration damping material.

11. A coupling assembly component for damping the transmission of vibration between first and second elements while transmitting force between the first and second elements, said coupling assembly comprising an annular base adapted to be connected with the first element, a first annular friction surface which is coaxial with said base and is movable into engagement with a second annular friction surface connected with the second element, annular fluid extensible tube means which is coaxial with said base and is radially extensible under the influence of fluid pressure in said tube means to move said first friction surface into engagement with the second friction surface, said annular fluid extensible tube means including a reinforcing layer and a cover layer, said cover layer extending around the outside of said reinforcing layer, and an annular layer of vibration damping material molded between and connected with said tube means and said base, said annular layer of vibration damping material having a radial extent which is at least twice as great as the radial extent of a portion of said cover layer disposed between said reinforcing layer and said annular layer of vibration damping material.

12. A coupling assembly component as set forth in claim 11 wherein said annular layer of vibration damping material has a radial thickness of at least one inch.

13. A coupling assembly component as set forth in claim 11 wherein said cover layer is formed of neoprene and said annular layer of vibration damping material is formed of natural rubber which has been molded against and bonded to the side surface of said cover layer and has been molded against and bonded to the side surface of said base.

14. A coupling assembly component as set forth in claim 11 wherein said annular layer of vibration damping material is formed of an elastomeric material having vibration damping characteristics which are different than the vibration damping characteristics of the material forming said cover layer.

15. A coupling assembly component as set forth in claim 14 wherein said cover layer has a first hardness and said annular layer of vibration damping material has a second hardness which is less than said first hardness.

16. A coupling assembly component as set forth in claim 15 wherein said first hardness is a Shore A hardness of approximately 60 and said second hardness is a Shore A hardness of approximately 35.

17. A coupling assembly component as set forth in claim 15 wherein said first and second hardnesses are within a range of Shore A hardness of 20 to 90.

* * * * *